(12) United States Patent
Miura et al.

(10) Patent No.: US 12,242,627 B2
(45) Date of Patent: Mar. 4, 2025

(54) RETENTION-REPLACEMENT PROBABILITY GENERATION DEVICE, RETENTION-REPLACEMENT PERTURBATION DEVICE, RETENTION-REPLACEMENT PROBABILITY GENERATION METHOD, RETENTION-REPLACEMENT PERTURBATION METHOD, AND PROGRAM

(71) Applicant: NIPPON TELEGRAPH AND TELEPHONE CORPORATION, Tokyo (JP)

(72) Inventors: Takayuki Miura, Musashino (JP); Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 271 days.

(21) Appl. No.: 17/765,441

(22) PCT Filed: Oct. 11, 2019

(86) PCT No.: PCT/JP2019/040235
§ 371 (c)(1),
(2) Date: Mar. 31, 2022

(87) PCT Pub. No.: WO2021/070361
PCT Pub. Date: Apr. 15, 2021

(65) Prior Publication Data
US 2022/0382896 A1    Dec. 1, 2022

(51) Int. Cl.
*G06F 21/62* (2013.01)

(52) U.S. Cl.
CPC .................. *G06F 21/6218* (2013.01)

(58) Field of Classification Search
CPC .................................... G06F 21/6218
See application file for complete search history.

(56) References Cited

U.S. PATENT DOCUMENTS 10,395,059 B2 *  8/2019  Scaiano ............... G06N 7/01
10,621,203 B2 *  4/2020  Hunt ................... G06F 16/283
(Continued)

OTHER PUBLICATIONS

Agrawal et al., "Privacy Preserving OLAP", In Proceedings of the 2005 ACM SIGMOD international conference on Management of data, Jun. 14-16, 2005, pp. 251-262.

*Primary Examiner* — Techane Gergiso
(74) *Attorney, Agent, or Firm* — XSENSUS LLP (57) ABSTRACT

Provided is a retention-replacement probability generation device that is capable of generating retention-replacement probability that realizes retention-replacement perturbation of a suitable level. Included are: a global optimal solution determining unit that, outputs a global optimal solution in a case where a global optimal solution exists that is a replacement probability of the attribute values in which the transition matrix P and histogram vector expression v of the attribute values yield $\|Pv-v\|=0$; a region generating unit that, in a case where the global optimal solution does not exist, generates a region that is defined by an inequality equivalent to conditions for both replacement probabilities corresponding to i'th and j'th attribute values satisfying ε-differential privacy, and an inequality equivalent to conditions for the replacement probability of one and the retention probability of the other corresponding to the i'th and the j'th attribute values satisfying ε-differential privacy.

6 Claims, 4 Drawing Sheets

(56) References Cited

U.S. PATENT DOCUMENTS

| | | | |
|---|---|---|---|
| 10,984,113 B1* | 4/2021 | Dhaliwal | H04L 63/14 |
| 11,361,084 B1* | 6/2022 | So | G06F 21/6245 |
| 11,429,853 B2* | 8/2022 | Zhang | G06F 18/285 |
| 2009/0254971 A1* | 10/2009 | Herz | G06Q 10/10 |
| | | | 726/1 |
| 2014/0040172 A1* | 2/2014 | Ling | G06N 5/022 |
| | | | 706/12 |
| 2014/0137260 A1* | 5/2014 | Wang | G06F 21/6254 |
| | | | 726/26 |
| 2017/0293772 A1* | 10/2017 | Chen | G06F 21/6227 |
| 2018/0189164 A1* | 7/2018 | Kulkarni | G06F 21/6245 |
| 2018/0322279 A1* | 11/2018 | Beskorovajnov | G06F 16/221 |
| 2020/0018607 A1* | 1/2020 | Balu | H04W 12/02 |
| 2020/0327252 A1* | 10/2020 | McFall | G06F 21/78 |

* cited by examiner

RETENTION-REPLACEMENT PROBABILITY GENERATION DEVICE, RETENTION-REPLACEMENT PERTURBATION DEVICE, RETENTION-REPLACEMENT PROBABILITY GENERATION METHOD, RETENTION-REPLACEMENT PERTURBATION METHOD, AND PROGRAM

CROSS-REFERENCE TO RELATED APPLICATION

The present application is based on PCT filing PCT/JP2019/040235, filed Oct. 11, 2019, the entire contents of which are incorporated herein by reference.

TECHNICAL FIELD

The present invention relates to technology of privacy-preserving of individual data by probabilistic means in a database, and relates to a retention-replacement probability generating device, a retention-replacement perturbation device, a retention-replacement probability generating method, a retention-replacement perturbation method, and a program.

BACKGROUND ART

NPL 1 is a technology of privacy-preserving of individual data by probabilistic means in a database. The retention-replacement perturbation used here is protective processing technology of "retaining information with a certain probability and rewriting information with other information with a certain probability, in each record".

CITATION LIST

Non Patent Literature

[NPL 1] Rakesh Agrawal, Ramakrishnan Srikant, and Dilys Thomas. Privacy preserving olap. In Proceedings of the 2005 ACM SIGMOD international conference on Management of data, pp. 251-262. ACM, 2005.

SUMMARY OF THE INVENTION

Technical Problem

However, in the data protection processing technique in NPL 1, a uniform retention probability is set for each attribute value, and there is a possibility that protection processing beyond what is necessary may be applied, depending on the source database.

Accordingly, it is an object of the present invention to provide a retention-replacement probability generation device that is capable of generating a retention-replacement probability that realizes retention-replacement perturbation of a suitable degree.

Means for Solving the Problem

A retention-replacement probability generation device according to the present invention includes a global optimal solution determining unit, a region generating unit, and an in-region optimal solution generating unit.

Regarding a transition matrix P in which, with regard to each of d attribute values where d is an integer of no less than 2, a retention probability of a predetermined attribute value and a replacement probability group in a case of replacing the predetermined attribute value with another attribute value at a uniform probability are a column or a row corresponding to the predetermined attribute value, and columns or rows corresponding to the attribute values are arrayed in a row or column direction, the global optimal solution determining unit determines whether or not a global optimal solution exists that is a replacement probability of the attribute values in which the transition matrix P and histogram vector expression v of the attribute values yield $\|Pv-v\|=0$, and in a case where the global optimal solution exists, outputs the global optimal solution. In a case where the global optimal solution does not exist, the region generating unit generates a region that is to be satisfied by coordinates $(x, y)=(q_i, q_j)$ of replacement probabilities corresponding to i'th and j'th attribute values that satisfy $1 \leq i \leq d$, $1 \leq j \leq d$ and $i \neq j$, and that is defined by an inequality equivalent to conditions for both replacement probabilities corresponding to the i'th and the j'th attribute values satisfying ε-differential privacy, and an inequality equivalent to conditions for the replacement probability of one and the retention probability of the other corresponding to the i'th and the j'th attribute values satisfying ε-differential privacy. The in-region optimal solution generating unit generates and outputs an in-region optimal solution that minimizes $\|Pv-v\|$ within the region.

Effects of the Invention

According to the retention-replacement probability generation device of the present invention, a retention-replacement probability that realizes retention-replacement perturbation of a suitable degree can be generated.

DESCRIPTION OF EMBODIMENTS

An embodiment of the present invention will be described below in detail. Note that components that have the same function are denoted by the same numerals, and repetitive description will be omitted.

Embodiment 1

A retention-replacement probability generation device and a retention-replacement perturbation device according to Embodiment 1 will be described below. The retention-replacement probability generation device and the retention-replacement perturbation device according to the present embodiment realize retention-replacement perturbation of histogram format data that has a high level of utility, while satisfying a certain level of privacy protection.

Figure 1:
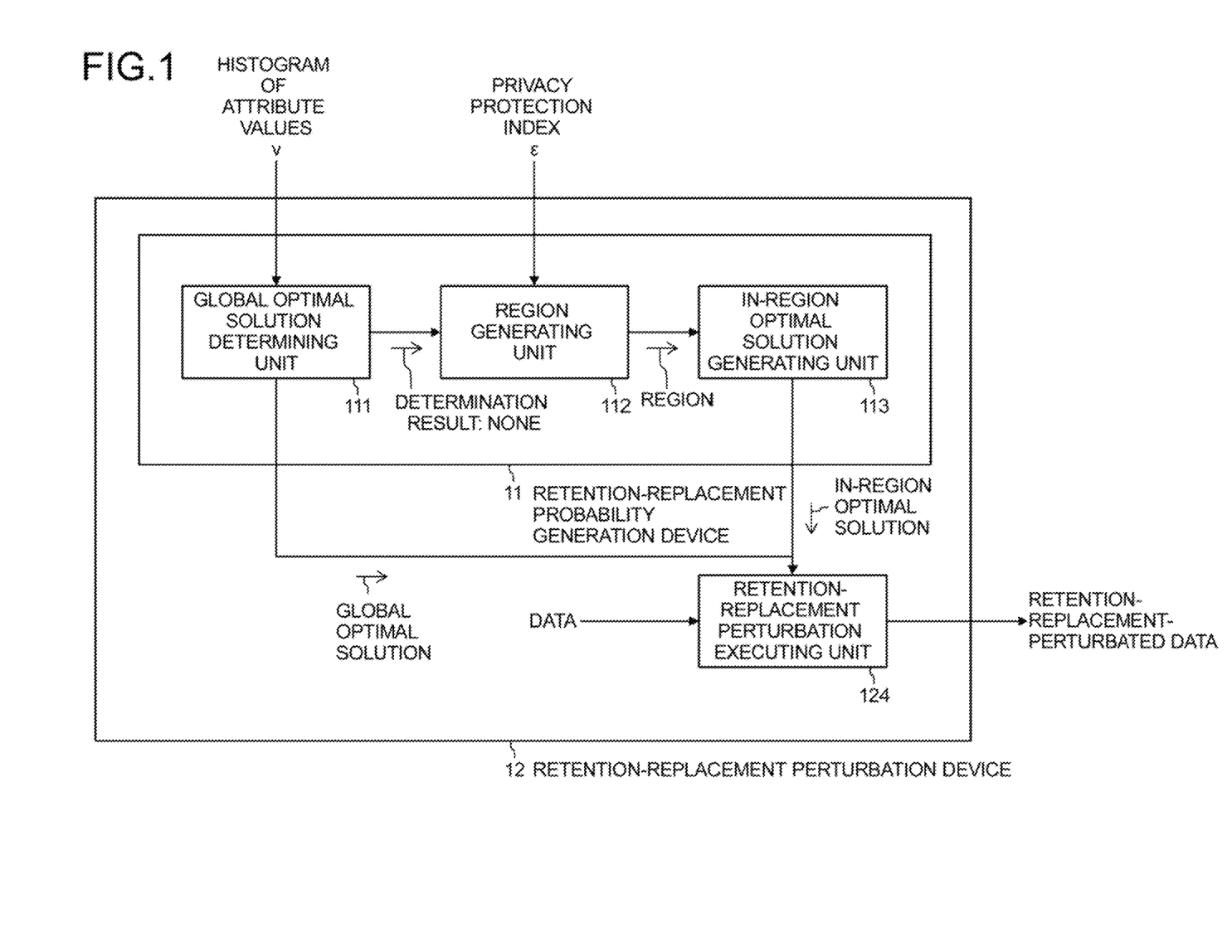
FIG. 1 is a block diagram illustrating a configuration of a retention-replacement probability generation device and a retention-replacement perturbation device according to a first embodiment.

A configuration of a retention-replacement probability generation device 11 and a retention-replacement perturbation device 12 according to the present embodiment will be described below with reference to FIG. 1. The retention-replacement probability generation device 11 according to the present embodiment includes a global optimal solution determining unit 111, a region generating unit 112, and an in-region optimal solution generating unit 113, as illustrated in the Figure. The retention-replacement perturbation device 12 according to the present embodiment is configured including a retention-replacement perturbation executing unit 124, in addition to the above-described configuration.

<Input to and Output from Retention-Replacement Probability Generation Device 11>

Input to and output from the retention-replacement probability generation device 11 according to the present embodiment is as follows.

Input—attribute value histogram $v=(v_1, \ldots, v_d) \in Z_d$ (combination of d integer values)

Input—privacy protection index $\varepsilon$ (positive real number)

Output—global optimal solution or in-region optimal solution

<Input to and Output from Retention-Replacement Perturbation Device 12>

Input to and output from the retention-replacement perturbation device 12 according to the present embodiment is as follows.

Input—Attribute value histogram $v=(v_1, \ldots, v_d) \in Z_d$ (combination of d integer values, where d is an integer of no less than 2)

Input—privacy protection index $\varepsilon$ (positive real number)

Input—data (data for execution of retention-replacement perturbation)

Output—retention-replacement-perturbated data following transition matrix P that minimizes $\|Pv-v\|$ out of data satisfying $\varepsilon$-differential privacy where $\|x\|$ represents squared norm of vector $x \in R^d$.

transition matrix P will be described later.

$\varepsilon$-differential privacy is an index for measuring the safety of a protection mechanism (Reference NPL 1: Cynthia Dwork, Aaron Roth, et al. The algorithmic foundations of differential privacy. Foundations and Trends in Theoretical Computer Science, Vol. 9, No. 3-4, pp. 211-407, 2014.)

<Operations>

Figure 2:
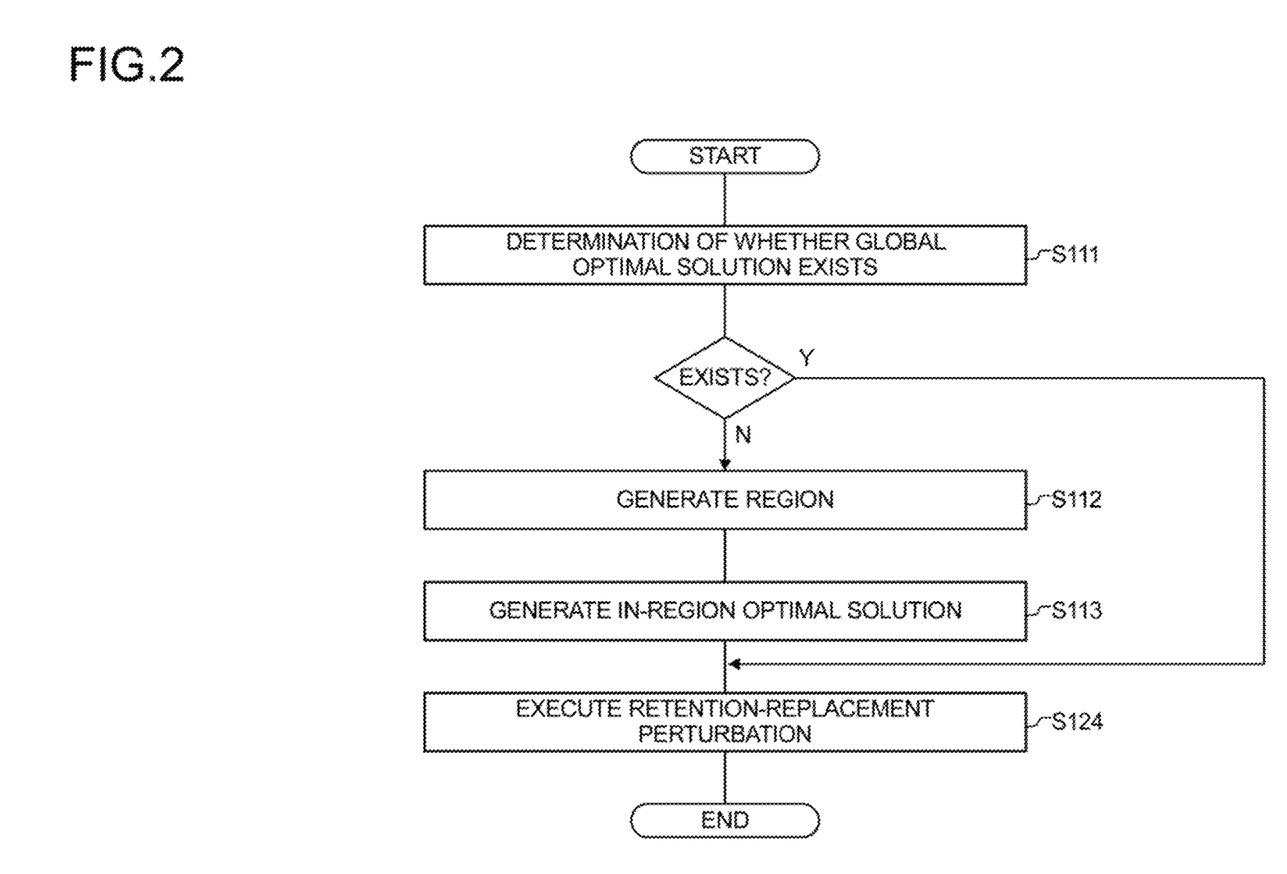
FIG. 2 is a flowchart illustrating operations of the retention-replacement probability generation device and the retention-replacement perturbation device according to the first embodiment.

Operations of the components will be described below with reference to FIG. 2. Note that in advance to operation of the components, histogram $v \in Z^d$, and privacy protection index $\varepsilon > 0$ are set, and input to the device.

[Global Optimal Solution Determining Unit 111]

The global optimal solution determining unit 111 determines whether or not a global optimal solution $q^? \in R^d$ exists that is a replacement probability of the attribute values in which the transition matrix P and histogram vector expression v of the attribute values yield $\|Pv-v\|=0$, and in a case where a global optimal solution exists, outputs the global optimal solution (S111). Now, the transition matrix P is a matrix in which, with regard to each of d attribute values, a retention probability of a predetermined attribute value and a replacement probability group in a case of replacing the predetermined attribute value with another attribute value at a uniform probability are a column or a row corresponding to the predetermined attribute value, and columns or rows corresponding to the attribute values are arrayed in the row or column direction.

<<Transition Matrix P>>

Now, the transition matrix P is expressed as follows, using retention probability $p_k=1-q_k$ (k=1, ..., d) of attribute values of index k.

$$P = \begin{pmatrix} 1-q_1 & \frac{q_2}{d-1} & \cdots & \frac{q_d}{d-1} \\ \frac{q_1}{d-1} & 1-q_2 & \cdots & \frac{q_d}{d-1} \\ \vdots & \vdots & \ddots & \vdots \\ \frac{q_1}{d-1} & \frac{q_2}{d-1} & \cdots & 1-q_d \end{pmatrix} \quad [\text{Math. 1}]$$

As described above, a uniform retention probability is set in the conventional technology, and accordingly, $q_1=q_2 \cdots =q_d$ in the above P in the conventional technology (this value is represented by a). Accordingly, this is expressed as $$P_0 = \begin{pmatrix} 1-\alpha & \frac{\alpha}{d-1} & \cdots & \frac{\alpha}{d-1} \\ \frac{\alpha}{d-1} & 1-\alpha & \cdots & \frac{\alpha}{d-1} \\ \vdots & \vdots & \ddots & \vdots \\ \frac{\alpha}{d-1} & \frac{\alpha}{d-1} & \cdots & 1-\alpha \end{pmatrix} \quad [\text{Math. 2}]$$

in a case of configuring a transition matrix in the conventional technology. The retention-replacement probability generation device 11 and the retention-replacement perturbation device 12 according to the present embodiment have a feature that does not exist in the conventional technology, with regard to the point that the transition matrix which should be expressed as $P_0$ in the conventional technology is expressed as P.

Note that in a situation in which the histogram v is input in a fixed manner, it should be noted that $\|Pv-v\|$ is a function of $q=(q_1, \ldots, q_d)$. $\|Pv-v\|$ always has a value no less than 0, and accordingly if a global optimal solution does exist, this is a point that gives the minimal value.

Note that in the transition matrix P, if the replacement probability $q_1=q_2=\ldots q_d=0$, the transition matrix is an identity matrix, i.e., $$P = \begin{pmatrix} 1 & 0 & \cdots & 0 \\ 0 & 1 & \cdots & 0 \\ \vdots & \vdots & \ddots & \vdots \\ 0 & 0 & \cdots & 1 \end{pmatrix}. \quad [\text{Math. 3}]$$

In this case, $\|Pv-v\|=0$ holds as a matter of course, but no data replacement is performed, and accordingly the data is not protected. Generally, there is a tradeoff relation between trying to make the value of $\|Pv-v\|$ smaller and to strongly protect the data. Accordingly, in a later-described step S112, conditions for the replacement probability $q=(q_1, \ldots, q_d)$ to satisfy will be defined applying the concept of $\varepsilon$-differential privacy.

[Region Generating Unit 112]

In a case where no global optimal solution exists as a result of the determination in step S111, the region generating unit 112 generates a region that is to be satisfied by coordinates $(x, y)=(q_i, q_j)$ of replacement probabilities corresponding to i'th and j'th attribute values that satisfy $1 \leq i \leq d$, $1 \leq j \leq d$ and $i \neq j$, and that is defined by the following two inequalities (S112). A first is an inequality equivalent to conditions for both replacement probabilities corresponding to the i'th and the j'th attribute values to satisfy ε-differential privacy. A second is an inequality equivalent to conditions for the replacement probability of one and the retention probability of the other corresponding to the i'th and the j'th attribute values to satisfy F-differential privacy.

<<Function Make Domain>>

More specifically, step S112 is realized by executing the following function Make domain. The function Make domain is a function having the following inputs and outputs.

Inputs (two)
attribute value histogram $v=(v_1, \ldots, v_d) \in Z^d$ (combination of d integer values)
privacy protection index ε (positive real number)
Outputs (two)
3d (d−1)×d matrix A
3d (d−1) next vector b Now, the outputs A and b satisfy the following nature. The simultaneous inequality $Aq \leq b$ with respect to $q \in R^d$ is equivalent to $(x, y) = (q_i, q_j)$ satisfying the following six inequalities with respect to any i and j ($1 \leq i \leq d$, $1 \leq j \leq d$) that are different to each other.

$$\begin{cases} y \leq e^{\varepsilon} x & (1) \\ y \geq e^{-\varepsilon} x & (2) \\ y \geq e^{-\varepsilon}(d-1)(1-x) & (3) \\ y \leq e^{\varepsilon}(d-1)(1-x) & (4) \\ y \geq 1 - \dfrac{e^{\varepsilon}}{d-1} x & (5) \\ y \leq 1 - \dfrac{e^{-\varepsilon}}{d-1} x & (6) \end{cases}$$ [Math. 4]

Figure 3:
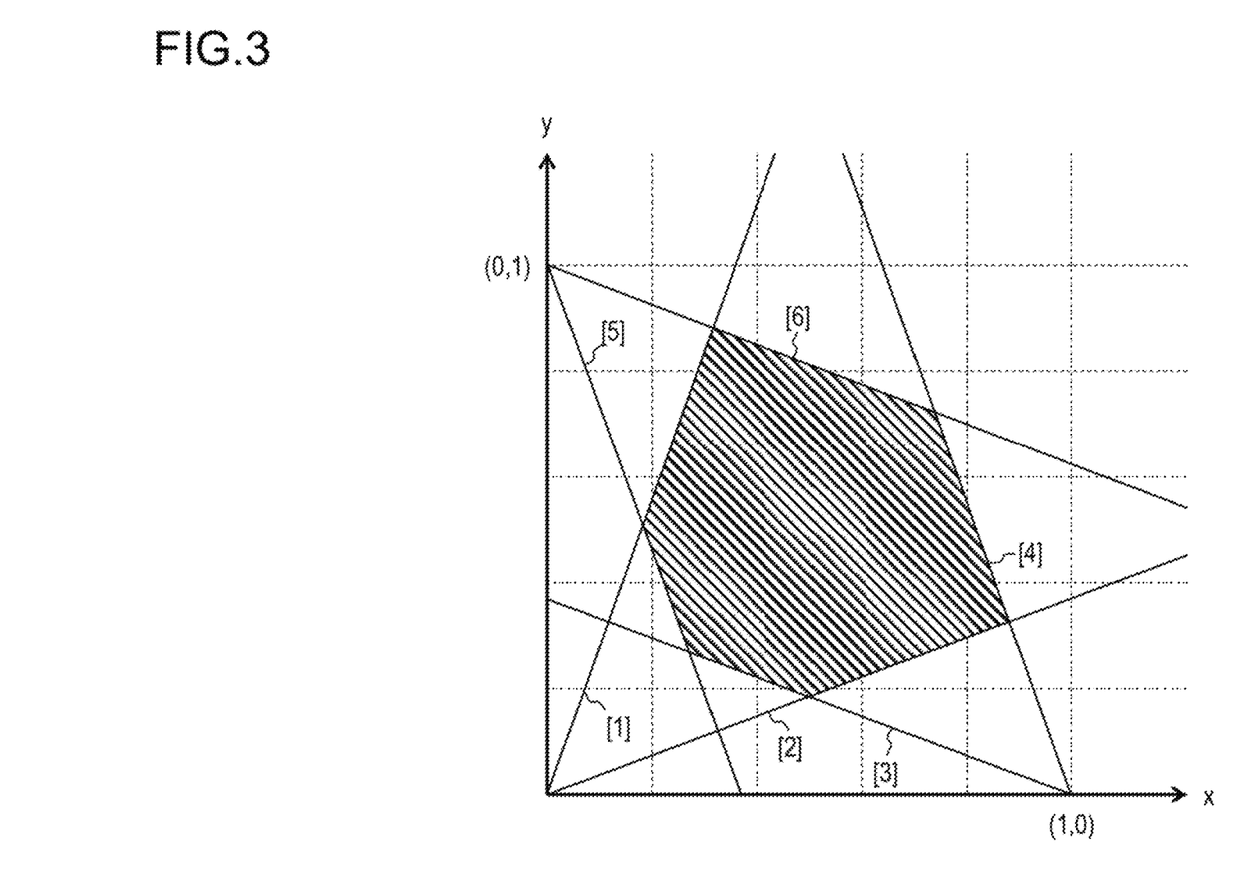
FIG. 3 is diagram showing an example of a region generated by the retention-replacement probability generation device and the retention-replacement perturbation device according to the first embodiment.

FIG. 3 illustrates an example of a region generated in step S112. As shown in the Figure, a region that satisfies inequality (1) and inequality (2) is a region between two linear functions [1] and [2] that pass through the origin, with the inequality (1) and the linear function [1], and the inequality (2) and the linear function [2], respectively corresponding (which is true hereinafter as well). The inequalities (1) and (2) here are

[Math. 5]

$$\begin{cases} \dfrac{y}{x} \leq e^{\varepsilon} \\ \dfrac{y}{x} \geq e^{-\varepsilon} \end{cases}$$ [Math. 5]

Accordingly, the inequalities (1) and (2) are inequalities equivalent to conditions $$\begin{cases} \dfrac{\frac{q_j}{(d-1)}}{\frac{q_i}{(d-1)}} \leq e^{\varepsilon} \\ \dfrac{\frac{q_j}{(d-1)}}{\frac{q_i}{(d-1)}} \geq e^{-\varepsilon} \end{cases}$$ [Math. 6]

$$= \begin{cases} \dfrac{q_j}{q_i} \leq e^{\varepsilon} \\ \dfrac{q_j}{q_i} \geq e^{-\varepsilon} \end{cases}$$

in which both replacement probabilities $q_i/(d-1)$, $q_j/(d-1)$ corresponding to the i'th and j'th attribute values satisfy ε-differential privacy.

In the same way, the inequalities (3) and (4) correspond to the linear functions [3] and [4] respectively, and $$\begin{cases} \dfrac{y}{(d-1)(1-x)} \geq e^{-\varepsilon} \\ \dfrac{y}{(d-1)(1-x)} \leq e^{\varepsilon} \end{cases}$$ [Math. 7]

holds. Accordingly, the inequalities (3) and (4) are inequalities equivalent to conditions $$\begin{cases} \dfrac{y}{(d-1)(1-x)} \geq e^{-\varepsilon} \\ \dfrac{y}{(d-1)(1-x)} \leq e^{\varepsilon} \end{cases}$$ [Math. 8]

in which the retention probability $1-q_1$ corresponding to the i'th attribute value and the replacement probability $q_j/(d-1)$ corresponding to the j'th attribute value satisfy ε-differential privacy.

In the same way, the inequalities (5) and (6) correspond to the linear functions [5] and [6] respectively, and $$\begin{cases} \dfrac{(1-y)(d-1)}{x} \leq e^{\varepsilon} \\ \dfrac{(1-y)(d-1)}{x} \geq e^{-\varepsilon} \end{cases}$$ [Math. 9]

holds. Accordingly, the inequalities (5) and (6) are inequalities equivalent to conditions $$\begin{cases} \dfrac{(1-q_j)(d-1)}{q_i} \leq e^{\varepsilon} \\ \dfrac{(1-q_j)(d-1)}{q_i} \geq e^{-\varepsilon} \end{cases}$$ [Math. 10]

in which the replacement probability $q_i/(d-1)$ corresponding to the i'th attribute value and the retention probability $1-q_j$ corresponding to the j'th attribute value satisfy ε-differential privacy.

Thus, the retention-replacement probability generation device 11 and the retention-replacement perturbation device 12 according to the present embodiment have a feature that does not exist in the conventional technology, with regard to the point that conditions to be satisfied by the replacement probabilities $q=(q_1, \ldots, q_d)$ that are the components of the transition matrix P which is different from conventional arrangements are generated as a region defined by six inequalities, applying the concept of ε-differential privacy.

[In-Region Optimal Solution Generating Unit 113]

The in-region optimal solution generating unit 113 generates and outputs an in-region optimal solution that minimizes $\|Pv-v\|$ within the region defined by the above-described inequalities (1) through (6) (S113).

<<Function CVXOPT>>

An algorithm that yields a point giving a minimal value, using quadratic programming, with regard to an objective function expressed by a quadratic expression in the region expressed by linear inequalities, will be written as CVXOPT. Step S113 is realized by executing the following function CVXOPT. The function CVXOPT is a function that has the following inputs and output.

Inputs (two)
region $\{q \in R^d | Aq \leq b\}$
objective function set in region
Output (one)
point $q^? \in R^d$ in region that minimizes the objective function

[Retention-Replacement Perturbation Executing Unit 124]

The retention-replacement perturbation executing unit 124 executes retention-replacement perturbation of input data, on the basis of the global optimal solution or the in-region optimal solution (S124).

Algorithm 1: Specific Algorithm of Device According to Present Embodiment

Operations of the retention-replacement probability generation device 11 and the retention-replacement perturbation device 12 according to the present embodiment are realized by the algorithm 1 shown below, for example.

Input: v (histogram), ε (privacy protection index)
Output: retention-replacement-perturbated data that satisfies ε-differential privacy, following transition matrix P that minimizes $\|Pv-v\|$
1: reorder v in descending order
2: A, b←Make domain (v, ε)
3: if $v_1 > e^\varepsilon \cdot v_d$ then (determination of presence of global optimal solution: no-presence case 1)
4: $(q_1, \ldots, q_d) \leftarrow$ CVXOPT (A, b, $\|Pv-v\|$)

$$5: \text{else if } e^\varepsilon(d-1)\left(\frac{1}{v_d} - \frac{1}{v_1}\right) + \frac{1}{v_{d-1}} > \frac{e^{2\varepsilon}}{v_2} \text{ then} \quad \text{[Math. 11]}$$

(Determination of Presence of Global Optimal Solution: No-Presence Case 2)
6: $(q_1, \ldots, q_d) \leftarrow$ CVXOPT (A, b, $\|Pv-v\|$)
7: else (case of presence of global optimal solution)

$$8: t \leftarrow \frac{e^{-\varepsilon}(d-1)}{\frac{v_d}{v_2} + e^{-\varepsilon}(d-1)\frac{v_d}{v_1}} \quad \text{[Math. 12]}$$

$$9: (q_1, \ldots, q_d) \leftarrow \left(\frac{v_d}{v_1} \cdot t, \frac{v_d}{v_2} \cdot t, \ldots, t\right)$$

10: end if
11: reorder $q_1, \ldots, q_d$ to correspond to original v
12: P←$(q_1, \ldots, q_d)$: create transition matrix
13: output retention-replacement-perturbated data that follows P The reason why two conditions are set in line 3 and line 5 of algorithm 1 regarding a case in which no global optimal solution exists is as follows. Presence of a global optimal solution can be expressed by the following (i), or (ii) and (iii).

[Math. 13]

$$t \cdot \left(\frac{v_d}{v_1}, \ldots, \frac{v_d}{v_{d-1}}, 1\right) \in D_{\varepsilon,d} \quad \text{(i)}$$

$$\frac{v_1}{v_d} \leq e^\varepsilon \quad \text{(ii)}$$

$$\frac{e^{-\varepsilon}(d-1)}{\frac{v_d}{v_2} + e^{-\varepsilon}(d-1)\frac{v_d}{v_1}} \leq t \leq \frac{e^\varepsilon(d-1)}{e^\varepsilon(d-1) + \frac{v_d}{v_{d-1}}} \quad \text{(iii)}$$

Note that $t \in [0, 1]$ holds, and $D_{\varepsilon,d}$ represents one region in input of the algorithm. That is to say, since (i) (ii) and (iii), in a case in which no global optimal solution exists,
not (i)↔not ((ii) and (iii))
↔not (ii) or not (iii) holds. Accordingly, a case in which no global optimal solution exists is equivalent to $$\frac{v_1}{v_d} > e^\varepsilon \quad \text{[Math. 14]}$$

or $$\frac{e^{-\varepsilon}(d-1)}{\frac{v_d}{v_2} + e^{-\varepsilon}(d-1)\frac{v_d}{v_1}} > \frac{e^\varepsilon(d-1)}{e^\varepsilon(d-1) + \frac{v_d}{v_{d-1}}} \quad \text{[Math. 15]}$$

being satisfied. Accordingly, the first inequality corresponds to the conditions of line 3 in algorithm 1, and the second inequality to the conditions of line 5 in algorithm 1, respectively.

Advantages of Retention-Replacement Probability Generation Device 11 and Retention-Replacement Perturbation Device 12 According to Embodiment 1

Privacy protection that enables analysis with higher precision than the conventional technique is realized.

<Notes>

The device according to the present invention, as a standalone hardware entity for example, has an input unit to which a keyboard or the like can be connected, and an output unit to which a liquid crystal display or the like can be connected, a communication unit connectable to a communication device (e.g., communication cable) that can communicate externally from the hardware entity, a CPU (Central Processing Unit, may have cache memory, registers, etc.), RAM and ROM that are memory, an external storage device that is a hard disk, and a bus that connects the input unit, output unit, communication unit, CPU, RAM, ROM, and external storage device so as to be capable of exchanging data therebetween. Also, a device (drive) that can read from and write to a recording medium such as a CD-ROM or the like, and so forth, may be provided to the hardware entity as necessary. Examples of physical entities having such hardware resources include a general purpose computer or the like.

The external storage device of the hardware entity stores programs necessary for realizing the above-described functions, and data and so forth necessary for processing of the programs (this is not limited to the external storage device, and programs may be stored in ROM that is a read-only storage device, for example). Also, data and so forth obtained by processing performed by these programs is stored in RAM, the external storage device, and so forth, as appropriate.

In the hardware entity, the programs stored in the external storage device (or ROM or the like) and data necessary for processing of the programs are read into memory as necessary, and subjected to interpreting processing by the CPU as appropriate. As a result, the CPU realizes predetermined functions (the components described above as so-and-so unit, so-and-so means, and so forth).

The present invention is not limited to the above-described embodiments, and modifications can be made as appropriate without departing from the essence of the present invention. Also, processing described in the above embodiments is not restricted to being executed in the order of the time sequence described therein, and may be executed in parallel or individually, in accordance with the processing capabilities of the device executing processing, or as necessary.

In a case of realizing the processing functions at the hardware entity (device of the present invention) described in the above embodiments by a computer, the contents of processing for the function which the hardware entity should have are described as a program, as mentioned earlier. Executing this program on a computer thus realizes the processing functions of the above hardware entity on the computer.

Figure 4:
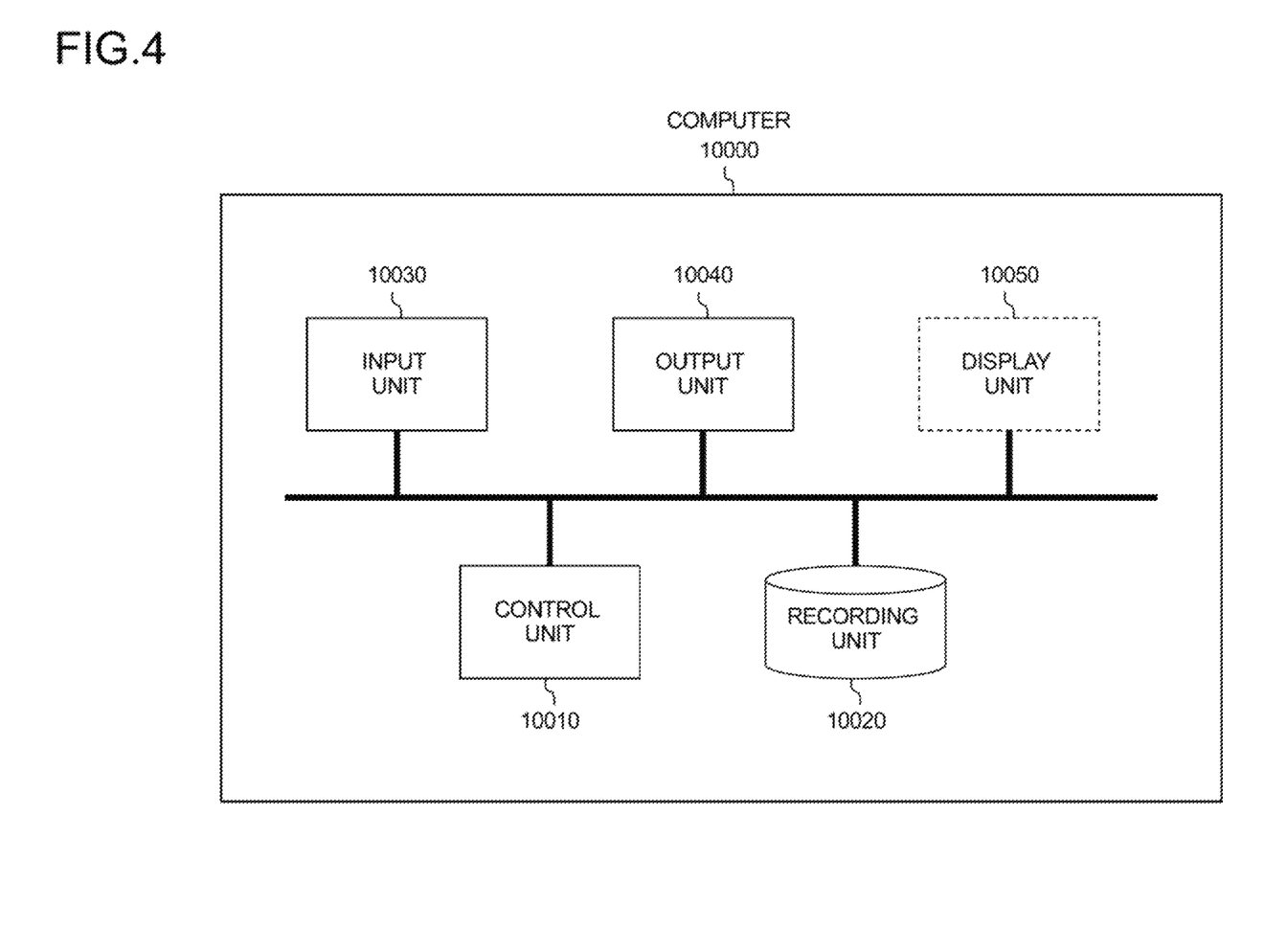
FIG. 4 is a diagram illustrating a functional configuration example of a computer.

The various types of processing described above can be carried out by a recording unit 10020 of a computer illustrated in FIG. 4 reading in a program for causing execution of the steps of the above-described method, and run by a control unit 10010, an input unit 10030, an output unit 10040, and so forth.

The program describing these contents of processing can be recorded in a computer-readable recording medium. Any computer-readable recording medium may be used, such as magnetic recording devices, optical discs, opto-magnetic recording media, semiconductor memory, and so forth, for example. Specifically, examples of a magnetic recording device that can be used include hard disk devices, flexible disks, magnetic tape, and so forth. Examples of optical discs that can be used include DVD (Digital Versatile Disc), DVD-RAM (Random Access Memory), CD-ROM (Compact Disc Read Only Memory), CD-R (Recordable)/RW (ReWritable), and so forth, examples of opto-magnetic recording media that can be used include MO (Magneto-Optical disc) and so forth, and examples of semiconductor memory that can be used include EEP-ROM (Electrically Erasable and Programmable-Read Only Memory) and so forth.

Also, distribution of this program is performed by sales, transfer, lending, and so forth of a transportable recording medium such as a DVD, CD-ROM, or the like, in which the program is recorded, for example. Further, a configuration for distribution of the program may be made by storing the program in a storage device of a server computer, and transferring the program from the server computer to other computers via a network.

A computer that executes such a program first temporarily stores the program recorded in a transportable recording medium or the program transferred from a server computer in its own storage device, for example. Then, at the time of executing the processing, the computer reads the program stored in its own recording medium, and executes processing following the program that has been read out. Also, as a separate form of executing the program, the computer may directly read the program from the transportable recording medium and execute processing following the program. Further, each time the program is transferred from the server computer to this computer, the computer may successively execute processing following the program that has been received. Also, a configuration may be made where the above-described processing is executed by a so-called ASP (Application Service Provider) type service, where the program is not transferred from the server computer to this computer, and the processing functions are realized just by instructions for execution thereof and acquisition of results. Note that the program according to this form includes information provided for processing by electronic computers that is equivalent to programs (data or the like that is not direct instructions to a computer but has a nature of defining processing of the computer).

Also, in this form, the hardware entity is configured by executing a predetermined program on a computer, but at least part of these contents of processing may be realized by hardware.

The invention claimed is:

1. A retention-replacement probability generation device, comprising:
   a storage or memory configured to store instructions; and
   a processor configured to execute the instructions stored in the storage or memory such that the processor is configured to:
   accept input of a histogram vector expression v of attribute values;
   accept input of a privacy protection index $\varepsilon$;
   determine whether or not a global optimal solution exists that is a replacement probability of the attribute values in which a transition matrix P and the histogram vector expression v of the attribute values yield $\|Pv-v\|=0$, in the transition matrix P for each of d attribute values of the attribute values where d is an integer of no less than 2, a retention probability of a predetermined attribute value and a replacement probability group in a case of replacing the predetermined attribute value with another attribute value at a uniform probability are a column or a row corresponding to the predetermined attribute value, and columns or rows corresponding to the d attribute values are arrayed in a row or column direction;
   in a case where the global optimal solution exists, output the global optimal solution; and
   in a case where the global optimal solution does not exist:
   generate a region that is to be satisfied by coordinates $(x, y)=(q_i, q_j)$ of replacement probabilities corresponding to i'th and j'th attribute values that satisfy $1 \leq i \leq d$, $1 \leq j \leq d$ and $i \neq j$, and that is defined by an inequality equivalent to conditions for both replacement probabilities corresponding to the i'th and the j'th attribute values satisfying $\varepsilon$-differential privacy, and an inequality equivalent to conditions for the replacement probability of one and the retention probability of the other corresponding to the i'th and the j'th attribute values satisfying $\varepsilon$-differential privacy;
   generate an in-region optimal solution that minimizes $\|Pv-v\|$ within the region; and
   output the in-region optimal solution, wherein
   the region is defined by six inequalities including two inequalities equivalent to conditions for both replacement probabilities corresponding to the i'th and the j'th attribute values satisfying $\varepsilon$-differential privacy, two inequalities equivalent to conditions for the retention probability corresponding to the i'th attribute value and the replacement probability corresponding to the j'th attribute value satisfying $\varepsilon$-differential privacy, and two inequalities equivalent to conditions for the replacement probability corresponding to the i'th attribute value and the retention probability corresponding to the j'th attribute value satisfying ε-differential privacy, the in-region optimal solution protects privacy of individual input data while enabling analysis with high precision, and the optimal solutions are provided by an application service provider.

2. A retention-replacement perturbation device comprising:

a storage or memory configured to store instructions; and a processor configured to execute the instructions stored in the storage or memory such that the processor is configured to:

accept input of a histogram vector expression v of attribute values;

accept input of a privacy protection index ε;

determine whether or not a global optimal solution exists that is a replacement probability of the attribute values in which a transition matrix P and the histogram vector expression v of the attribute values yield $\|Pv-v\|=0$, in the transition matrix P for each of d attribute values of the attribute values where d is an integer of no less than 2, a retention probability of a predetermined attribute value and a replacement probability group in a case of replacing the predetermined attribute value with another attribute value at a uniform probability are a column or a row corresponding to the predetermined attribute value, and columns or rows corresponding to the d attribute values are arrayed in a row or column direction;

in a case where the global optimal solution exists, output the global optimal solution;

in a case where the global optimal solution does not exist:

generate a region that is to be satisfied by coordinates $(x, y)=(q_i, q_j)$ of replacement probabilities corresponding to i'th and j'th attribute values that satisfy $1 \le i \le d$, $1 \le j \le d$ and $i \ne j$, and that is defined by an inequality equivalent to conditions for both replacement probabilities corresponding to the i'th and the j'th attribute values satisfying ε-differential privacy, and an inequality equivalent to conditions for the replacement probability of one and the retention probability of the other corresponding to the i'th and the j'th attribute values satisfying ε-differential privacy;

generate an in-region optimal solution that minimizes $\|Pv-v\|$ within the region; and output the in-region optimal solution;

accept input of individual input data whose privacy is to be preserved;

generate retention-replacement perturbated data by executing retention-replacement perturbation of the individual input data on the basis of the global optimal solution or the in-region optimal solution; and output the retention-replacement perturbated data, wherein the region is defined by six inequalities including two inequalities equivalent to conditions for both replacement probabilities corresponding to the i'th and the j'th attribute values satisfying ε-differential privacy, two inequalities equivalent to conditions for the retention probability corresponding to the i'th attribute value and the replacement probability corresponding to the j'th attribute value satisfying ε-differential privacy, and two inequalities equivalent to conditions for the replacement probability corresponding to the i'th attribute value and the retention probability corresponding to the j'th attribute value satisfying ε-differential privacy, the in-region optimal solution preserves the privacy of the individual input data while enabling analysis with high precision, and the optimal solutions are provided by an application service provider.

3. A retention-replacement probability generation method, comprising:

accepting input of a histogram vector expression v of attribute values;

accepting input of a privacy protection index ε;

determining whether or not a global optimal solution exists that is a replacement probability of the attribute values in which a transition matrix P and the histogram vector expression v of the attribute values yield $\|Pv-v\|=0$, in the transition matrix P for each of d attribute values where d is an integer of no less than 2, a retention probability of a predetermined attribute value and a replacement probability group in a case of replacing the predetermined attribute value with another attribute value at a uniform probability are a column or a row corresponding to the predetermined attribute value, and columns or rows corresponding to the d attribute values are arrayed in a row or column direction;

in a case where the global optimal solution exists, outputting the global optimal solution; and in a case where the global optimal solution does not exist:

generating a region that is to be satisfied by coordinates $(x, y)=(q_i, q_j)$ of replacement probabilities corresponding to i'th and j'th attribute value s that satisfy $1 \le i \le d$, $1 \le j \le d$ and $i \ne j$, and that is defined by an inequality equivalent to conditions for both replacement probabilities corresponding to the i'th and the j'th attribute values satisfying ε-differential privacy, and an inequality equivalent to conditions for the replacement probability of one and the retention probability of the other corresponding to the i'th and the j'th attribute values satisfying ε-differential privacy;

generating an in-region optimal solution that minimizes $\|Pv-v\|$ within the region; and outputting the in-region optimal solution, wherein the region is defined by six inequalities including two inequalities equivalent to conditions for both replacement probabilities corresponding to the i'th and the j'th attribute values satisfying ε-differential privacy, two inequalities equivalent to conditions for the retention probability corresponding to the i'th attribute value and the replacement probability corresponding to the j'th attribute value satisfying ε-differential privacy, and two inequalities equivalent to conditions for the replacement probability corresponding to the i'th attribute value and the retention probability corresponding to the j'th attribute value satisfying ε-differential privacy, the in-region optimal solution preserves privacy of individual input data while enabling analysis with high precision, and the optimal solutions are provided by an application service provider.

4. A non-transitory computer readable medium storing a computer program for causing a computer to perform the retention-replacement probability generation method according to claim 3.

5. A retention-replacement perturbation method comprising:
accepting input of a histogram vector expression v of attribute values;
accepting input of a privacy protection index $\varepsilon$;
determining whether or not a global optimal solution exists that is a replacement probability of the attribute values in which a transition matrix P and the histogram vector expression v of the attribute values yield $\|Pv-v\|=0$, in the transition matrix P for each of d attribute values of the attribute values where d is an integer of no less than 2, a retention probability of a predetermined attribute value and a replacement probability group in a case of replacing the predetermined attribute value with another attribute value at a uniform probability are a column or a row corresponding to the predetermined attribute value, and columns or rows corresponding to the d attribute values are arrayed in a row or column direction
in a case where the global optimal solution exists, outputting the global optimal solution;
in a case where the global optimal solution does not exist:
generating a region that is to be satisfied by coordinates $(x, y)=(q_i, q_j)$ of replacement probabilities corresponding to i'th and j'th attribute values that satisfy $1 \leq i \leq d$, $1 \leq j \leq d$ and $i \neq j$, and that is defined by an inequality equivalent to conditions for both replacement probabilities corresponding to the i'th and the j'th attribute values satisfying $\varepsilon$-differential privacy, and an inequality equivalent to conditions for the replacement probability of one and the retention probability of the other corresponding to the i'th and the j'th attribute values satisfying $\varepsilon$-differential privacy;
generating an in-region optimal solution that minimizes $\|Pv-v\|$ within the region; and
outputting the in-region optimal solution;
accepting input of individual input data whose privacy is to be preserved;
generating retention-replacement perturbated data by a step of executing retention-replacement perturbation of the individual input data on the basis of the global optimal solution or the in-region optimal solution; and
outputting the retention-replacement perturbated data,
wherein
the region is defined by six inequalities including two inequalities equivalent to conditions for both replacement probabilities corresponding to the i'th and the j'th attribute values satisfying $\varepsilon$-differential privacy, two inequalities equivalent to conditions for the retention probability corresponding to the i'th attribute value and the replacement probability corresponding to the j'th attribute value satisfying $\varepsilon$-differential privacy, and two inequalities equivalent to conditions for the replacement probability corresponding to the i'th attribute value and the retention probability corresponding to the j'th attribute value satisfying $\varepsilon$-differential privacy,
the in-region optimal solution preserves the privacy of the individual input data while enabling analysis with high precision, and
the optimal solutions are provided by an application service provider.

6. A non-transitory computer readable medium storing a computer program for causing a computer to perform the retention-replacement perturbation method according to claim 5.

* * * * *

UNITED STATES PATENT AND TRADEMARK OFFICE
CERTIFICATE OF CORRECTION

PATENT NO.         : 12,242,627 B2
APPLICATION NO.    : 17/765441
DATED              : March 4, 2025
INVENTOR(S)        : Takayuki Miura et al.

It is certified that error appears in the above-identified patent and that said Letters Patent is hereby corrected as shown below:

In the Claims

Column 10, Line 32 should be changed from "d attribute values of the attribute values where dis an" to - d attribute values of the attribute values where d is an -

Column 11, Line 24 should be changed from "d attribute values of the attribute values where dis an" to - d attribute values of the attribute values where d is an -

Column 12, Line 37 should be changed from "sponding to i'th and j'th attribute value s that satisfy" to - sponding to i'th and j'th attribute values that satisfy -

Signed and Sealed this
First Day of July, 2025

Coke Morgan Stewart
*Acting Director of the United States Patent and Trademark Office*